US007900576B2

(12) United States Patent
Marocco (10) Patent No.: US 7,900,576 B2
(45) Date of Patent: Mar. 8, 2011

(54) PROCESS AND DEVICE FOR TREATING AND CONSOLIDATING STONE BLOCKS AND SLABS

(75) Inventor: Giuseppe Marocco, Massa (IT)

(73) Assignee: Geo S.R.L., Settimo Torinese (IT)

( * ) Notice: Subject to any disclaimer, the term of this patent is extended or adjusted under 35 U.S.C. 154(b) by 453 days.

(21) Appl. No.: 12/090,289

(22) PCT Filed: May 10, 2006

(86) PCT No.: PCT/IT2006/000345
§ 371 (c)(1),
(2), (4) Date: Apr. 15, 2008

(87) PCT Pub. No.: WO2007/052319
PCT Pub. Date: May 10, 2007

(65) Prior Publication Data
US 2008/0206466 A1  Aug. 28, 2008

(30) Foreign Application Priority Data
Nov. 3, 2005 (IT) ................ TO2005A0780

(51) Int. Cl.
*C23C 14/00* (2006.01)
(52) U.S. Cl. .......... 118/50; 215/12.1; 427/296; 427/430
(58) Field of Classification Search ........ 118/50; 215/12.1; 427/296, 430
See application file for complete search history.

(56) References Cited

U.S. PATENT DOCUMENTS

| | | | | |
|---|---|---|---|---|
| 1,471,610 A | * | 10/1923 | Joy | 477/4 |
| 2,512,897 A | * | 6/1950 | David | 34/76 |
| 3,206,356 A | * | 9/1965 | Carlsmith | 162/237 |
| 3,636,917 A | * | 1/1972 | Baker | 118/712 |
| 4,013,809 A | * | 3/1977 | Marocco | 427/296 |

(Continued)

FOREIGN PATENT DOCUMENTS
EP          1170271 A      1/2002

OTHER PUBLICATIONS
International Search Report issued in parent International Patent Application No. PCT/IT2006/000345 on Nov. 6, 2006.

*Primary Examiner* — Parviz Hassanzadeh
*Assistant Examiner* — Albert Hilton
(74) *Attorney, Agent, or Firm* — David A. Farah; Sheldon Mak & Anderson PC (57) ABSTRACT

A system (10) is disclosed for treating and consolidating with hardenable resins stone blocks (1) comprising at least one liquid- and gas-tight sheet (2) adapted to form a containing housing (3) of a block (1); at least one permeable layer to the resin arranged between the block (1) and the sheet (2) adapted to create a distance between the block (1) and the sheet (2) through which resin can flow; at least one closing manifold (20), comprising a central body (5) and a cover (6), such closing manifold (20) being equipped with connecting means adapted to connect the interior of the containing housing (3) to at least one pressure control duct, at least one duct (15) connected to a first vacuum pump (21), at least one air inserting duct (19) inside the containing housing (3) and sealingly passing means of at least one resin supplying duct (17) supplied by resin storing, conditioning and mixing means; and an autoclave (13). A process using the system is further disclosed.

54 Claims, 3 Drawing Sheets

U.S. PATENT DOCUMENTS

| | | | |
|---|---|---|---|
| 4,092,393 A * | 5/1978 | Marocco | 264/102 |
| 5,925,449 A * | 7/1999 | Davidovits | 428/297.4 |
| 6,682,691 B1 * | 1/2004 | Marocco | 264/571 |
| 6,843,242 B2 * | 1/2005 | Marocco | 125/1 |
| 2003/0145841 A1 * | 8/2003 | Marocco | 125/1 |
| 2004/0076771 A1 * | 4/2004 | Marocco | 428/15 |
| 2004/0258846 A1 * | 12/2004 | Vaerewyck et al. | 427/430.1 |

* cited by examiner

PROCESS AND DEVICE FOR TREATING AND CONSOLIDATING STONE BLOCKS AND SLABS

CROSS-REFERENCE TO RELATED APPLICATION

The present Application is a 371 of International Patent Application No. PCT/IT2006/000345, titled "Process and Device for Treating and Consolidating Stone Blocks and Slabs," filed May 10, 2006, which claims priority from Italian Patent Application No. TO2005A000780 filed Nov. 3, 2005, the contents of which are incorporated in this disclosure by reference in their entirety.

1. Field of the Invention

The present invention refers to a device and a process for treating and consolidating natural stone blocks and slabs with hardenable resins, particularly for repairing their structural defects and for producing various types of composite panels in which the natural stone is connected to other stone slabs or sheets or nets or panels made of different materials for forming various types of composite panels.

2. Background Information

Natural stones, such as marbles, granites, onixes and stones in general, in addition to their decorative and aesthetic values, have an optimum level of physical and technical characteristics related to compression strength, are durable materials, are often adapted to be perfectly polished, but have a scarce traction resistance and often are structurally faulty.

Blocks of marble, granite, onix and other stones are extracted from quarries by using different extraction systems whose purpose is, when possible, to make available blocks with a regular and squared shape. Many natural stones however have widespreaded structural defects, such as cracks, flaws and fissures which, in addition to conditioning the extraction activities in a quarry, are afterwards present in individual extracted blocks and therefore in all semifinished and finished products which will be obtained from the blocks.

In the following working steps, blocks with a regular and squared shape are normally sawed in slabs on multi-blade frames, while coarse blocks are cut with diamond disk machines to directly obtain small modular formats. Material defects affect the whole transforming activity from raw materials to finished product and also negatively condition the activities downstream of production, material installation and work maintenance under normal use conditions.

The most relevant consequence of a natural raw material which was formed during millions of years of modifications of earth crust and therefore has non-constant and uncontrollable structural characteristics is that it is scarcely adapted to industrial series productions. In stone transforming activities, in fact, the basis for an industrial process is lacking: certainty of yields and costs, programmability of results, repeatability of productions with homogeneous quality standards. The same product tests tend to be subjective more than objective, and the whole activity is naturally confined to handicraft modes, with the presence of a man who follows the material under different working steps. It is obvious that production structures which need a continuous direct surveillance of personnel are necessarily limited to small company or department dimensions which can be directly controlled.

Industries which produce machines and plants for working stones initially were concentrated to improve and accelerate main activities of stone working, such as sawing in slabs with multi-blade frames or with diamond disk machines for small-sized manufactured articles and lines for surface polishing or smoothing finishing. As a paradox, however, the continuous progress made to chassis and finishing lines and the always greater working speed, in parallel, have more and more pointed out the problems of structure of materials which worsen possible performances. Improvements and working speed increase of these plants progressively guided the transforming industry to privilege the most healthy materials, till the same industry manufacturing transforming machinery understood the need of favouring block reinforcing and consolidating techniques and of making available lines for repairing slabs before taking care of their surface finishing. Now, finally, the structural check of raw materials, which should have been the priority objective in the search of solutions for the whole stone sector, was introduced tens of years late, in a sense giving priority to the less important route, the repairs of faulty slabs. Which is the reason for sawing un-cohesed and lesioned slabs, or even slabs not divided in many crop ends in order to then repair them, if it is possible to solve the problem, or part of the problem, upstreams? From the point of view of manufacturers of machines and plants for working natural stones, such activity, though paradoxically inefficient, has however allowed building and selling highly valuable lines in which the slabs are individually loaded, provided on their rear part with a net and coated with resin on their visible face with movements (also vertical ones) inside resin drying and hardening ovens, namely lines aimed for those which already have as well costly surface finishing lines which needed to be supplied with high production volumes.

By always following such philosophy, afterwards the use of resin-coating lines has been introduced also for closing surface granite micropores and also on perfectly healthy slabs which have no need for a rear reinforcement netting, only in order to allow a better polishing. Resin-coating lines dedicated to tiles and small marble and granite formats obtained from block cutting machines have also been made available, even though in a more reduced way. If the major objective of enabling any block to be sawed in coherent slabs capable to be handled had been followed, a relatively small market for supplying plants would have opened, at the same time reducing the need of having available slab-repairing lines and impairing the rich market of their related plants. For this reason, the problem of block consolidating has been wholly neglected by industries manufacturing machines and plants, leaving the search for solutions to those who saw blocks.

Along such direction, the first and more elementary solution, widely spreaded, has been, from years, gluing, on one or more faces of the block, slabs of stone material along normal places to the following sawing direction in such a way as to join fractures projecting on one or more block faces with a connecting bridge, to avoid that the block fracture opens or extends to the individual slabs. Another technique provides for the coating of one or more block faces with glass fiber and hardenable resins applied with brush or spray. Another technique provides for the building of a block containing box composed of wood boards, to then pour into the box and around the block some hardenable resins, with the addition of grit in empty spaces to reduce the average cost of the filling material. In more recent times, the complete block lining has been performed by inserting the block in a closed bag of plastic material inside of which a certain vacuum level has been made, before inserting liquid hardenable resins around the block and then keeping this vacuum till the resins harden.

Purpose of all these arrangements is forming a containing frame around the defective slabs obtained therefrom. This containment however is not always successful with the consequence that partially broken sawed slabs are obtained, divided into crops or lacking angles and parts. Every system has its supporters and all these system, obviously, have as strong supporters the manufacturers of slab repairing lines. Some studies have been performed for a more rational approach to the problem and some patents have been filed to set up block healing processes adapted to guarantee the penetration of hardenable resins in all fractures communicating with the block exterior. All these processes use vacuum and pressure differential with the atmosphere to forcedly introduce resin in block defects; some also use positive pressures to improve resin penetration.

The first known patent, Italian Patent No. 1,027,222, has been filed in the '70s. According to what is described in such patent, the block of stone material is wound into a flexible vessel, open on its top and immersed into a tank in which an oil can be poured. The tank is provided with an upper perimetral gasket on which a cover equipped with vacuum pump can be sealingly laid. After having made vacuum, resin is poured on the upper block face and its level can be changed by removing or inserting oil around the flexible vessel. Upon breaking vacuum, inserted air pushes the resin into the block fractures and structural discontinuities. After resin hardening, oil can be taken back to an external tank and the block can be extracted and sent to sawing. The experimental process results have been good, but from the point of view of its practical application, its limits are evident: the process is dirty due to the use of great amounts of oil, the block preparation is labour intensive and the process is scarcely productive due to the need of leaving oil in the site till the resin hardens.

Other attempts have been made with the use of sturdy metallic vessels or formworks to be assembled around the block. The extreme variability of block sizes, the difficulty of inserting protheses or poured or foamed materials for compensating macroscopic differences between formwork and contained block, the need of squaring the block, the need of disassembling and reassembling the formwork and replacing or cleaning, upon every treatment, the gaskets on every connection between horizontal and vertical slabs, make the process labour intensive and not able to be industrialised.

EP-A-0 962 430 solves the problem by making the block support the hydrostatic pressures of the resin poured onto the block and the pressures which occur during the process when vacuum is broken by inserting air in the autoclave. A liquid- and gas-tight coating is glued onto the block, suitably spaced therefrom through a plurality of projections which connect it to the block and which allow resin to freely flow around it. The process limits are the need of having plane block faces onto which the containing sheet has to be glued, the difficulty of guaranteeing housing tightness between base and perimeter and on edges, and the long times which is necessary to grant to the gluing agent used for connecting the housing to the block so that it assumes the necessary tightness characteristics for the process.

WO-A-02/002480 discloses an easier and more rational process, since it makes it unnecessary to glue the spacers, which are shaped as a resin-tight fabric, while the watertight sheath which wraps the block on its base and on its four walls is kept in position by sturdy structures fastened to a platform which is used to support and transport the block. The problem, again, is guaranteeing that the block has plane faces, in this case not because they are necessary to glue thereon the spacers, but because the resin consumption is as greater as wider is the gap between interfaces between block and vessel. In order to limit the resin consumption to a maximum, the patent provides for the covering of the upper block face with a plate of material with a thickness of some centimeters and whose specific weight is greater than the resin one and is built or coated with a plastic material on which resin cannot adhere.

Function of the plate is concentrating the resin only on a peripheral ring, a few centimeters wide, and thereby allowing a better level control without wastes, even if the block is not perfectly leveled on the upper face. A block with a 4 $m^2$ plane surface, which is covered at the end of the impregnation with one centimeter of liquid resin, however, has wasted 40 kilograms of a costly resin. Since a surface portion of the block not covered with resin implies the operation failure and it is difficult to guarantee that the upper plane face is leveled with this accuracy, it is clear that it is important to be able to check the resin distribution by concentrating it on the perimeter with thicknesses equal to 8-9 centimeters, but on a small surface portion, thereby allowing an easier and safer check of resin level and lower consumptions.

Also as regards slabs, numerous healing attempts have been made.

EP-A-0 344 619 proposes the production in autoclave under vacuum of a plurality of slabs reinforcing them at the same time with a reinforcement material and structurally repairing them in a single process. The process limits are the required manual operations to insert reinforcing and separating slabs in separation cuts between slabs in a partially sawed block and the problem of having to suit a vessel to the always different block sizes.

The process described in U.S. Pat. No. 5,226,402 refers to the vacuum production of thin reinforced slabs, by overlapping on a structure already sawed slabs at a thickness which is twice the one which has to be obtained, increased by the frame blade thickness which will be used for dividing the slabs into two parts, by interposing a separating sheet and a reinforcing sheet arranged on both slab faces. Control instruments for pitch regularity and spacer members allow assembling, in the block, slabs whose distance between centers is equal to the frame blade one; the assembled block is then closed in a formwork, a wall of which is the slab supporting structure, with vacuum-tight gaskets between the various formwork components. After a 90° rotation, the formwork is then inserted in an autoclave for vacuum impregnation. After having hardened the resins used for impregnating, the block is removed from the formwork and is sawed with a multi-blade frame with the intermediate slab plane corresponding to the blade position, obtaining from every slab, after perimetral separating cutting, two thin reinforced slabs which are structurally repaired by joining the fracture edges with a resin bridge. The process limits are the difficult and many necessary manual operations and, again, the difficult adaptation of the formwork to the size of the pack of slabs.

In WO-A-02/060836, also the core healing of slabs, by filling all fractures which cross the slab or project only from one face, can be made in autoclave on multiple juxtaposed slabs for forming a multi-later block, these layers being mutually separated by a sheet on which resin cannot adhere and with resin-tight inter-slab nets. Contrary to slab repairing and reinforcing lines which are nowadays widely used, which has been mentioned above, which treat slabs individually with a sequential passage in many working stations, the process is performed simultaneously in a single operation on a plurality of juxtaposed slabs. In order to limit the comparison to repair and reinforcement of defective slabs, namely the practice which was used in the last 15-20 years since manufacturers of stone working machines found and promoted a wider market and produced and sold hundreds of always more articulated and quicker lines in order to make usable slabs of defective materials, the comparison of the healing result performed according to this patented process is objectively in favour of this latter one. The process in fact performs the core healing on the whole slab thickness, while the in-line treatment is limited to reinforce the slab on its rear face with a glass net and to aesthetically resin coat is on its visible face, to be surface finished with smoothing or polishing operations. Fractures remain open in the slab thickness and are only closed and made not visible near the surfaces with a thin resin film. In practice the slab was and remains a broken slab, treated in such a way that no one sees that it is broken. It can be marketed, but already during transport and still more in following cutting operations to obtain the required formats, it will create parts separating problems. Only the rear net which keeps them together will help in performing a following repair by gluing the parts.

The above invention further allows producing composite materials, composed of two or more components integrated to form materials having characteristics which exceed those deriving from the sum of characteristics and performances of individual components. Productions of stone-based composite materials are still nowadays performed with handicraft systems, with high costs which confine them to niche markets, while from the technical point of view their quality is not always acceptable, tend to show uncontrollable plane distortions and do not provide warranties of enduring in time. The technical result of the recently patented process is good, but the production process is complex and requires a costly tooling and can be improved and simplified, at the same time reducing costs per produced unit. The process however has the economically and technically important advantage of excluding the use of liquid- and gas-tight formworks, separating the block containment on its base and along its vertical walls with a liquid- and gas-tight sheet from the structures which can be adapted to different block sizes and aimed to resist to the hydrostatic pressure of the inserted resin. The process further realises a drastic reduction of volatile substances dispersed in the environment compared with those produced by the currently used lines for individually reinforcing and repairing the slabs.

SUMMARY OF THE INVENTION

Object of the present invention is therefore solving the above prior art problems, by providing a system for treating and consolidating stone blocks and slabs with hardenable resins which is easy and economic to use, which employs the same investments and plants for various applications, and which pays particular attention to industrialisation, environment and costs.

Moreover, an object of the present invention is providing a process which easily and economically enables treating and consolidating stone blocks and slabs, with reduced and perfectly controllable resin consumptions.

Another object of the present invention is providing a system and a process which allow consolidating natural stone blocks with a defective structure and defective natural stone slabs juxtaposed in order to form a multi-layer block, with the chance of adding, to such slabs or to thin and lightweight slabs, nets of other sheets or slabs of other materials to produce composite materials and which does without every need of containing the block in rigid formworks or of wrapping it only at its base and on its perimeter with containing sheets, taking care to limit as much as possible the resin consumption also on the upper block face, without the need of leveling its upper face and allowing to heal also relatively shapeless blocks, without the need of taking care of squaring them.

The above and other objects and advantages of the invention, which will result from the following description, are obtained with a system for treating and consolidating stone blocks and slabs as disclosed in claim 1.

Moreover, the above and other objects and advantages of the invention are obtained with a process for treating and consolidating stone blocks and slabs as disclosed in claim 27. Preferred embodiments and non-trivial variations of the present invention are the subject matter of the dependent claims.

BRIEF DESCRIPTION OF THE DRAWINGS

The present invention will be better described by some preferred embodiments thereof, provided as a non-limiting example, with reference to the enclosed drawings, in which:

FIG. 2a shows a front view of the system in a step of the process according to the present invention;

FIG. 2b shows a sectional view of a detail of the system in FIG. 2a;

FIG. 3a shows a side view of the system of FIG. 2a;

FIG. 3b shows a sectional view of a detail of the system of FIG. 3a; and

DETAILED DESCRIPTION OF A PREFERRED EMBODIMENT OF THE INVENTION

As previously mentioned, the present invention can advantageously be applied for impregnating and consolidating both a monolithic natural stone block and, as well, a block composed of a plurality of slabs which are variably organised according to the product which has to be obtained: consequently, such different examples will be designated herein below, for conciseness, by the term "block".

As will more clearly appear from the following description, the system and process according to the present invention allow obtaining with a different block preparation, but with the same process:

quarry blocks healed in all their fractures projecting outside the block;

slabs of structurally defective materials whose thickness is two or more centimeters, healed in all their thickness, with or without rear reinforcing net;

thin natural stone slabs reinforced on their back with a glass or carbon net or other fibers or nets and sheets of perforated steel to increase the slab flexure strength; the slab can be made of stone material which is healthy, or even originally defective, but healed in the block; any healed block of stone material can be sawed in slabs whose thickness is 10 mm or even 7 or 5 mm, when the reduced weight is a characteristic required by the application;

composite slabs with traditional thickness or thin which are lightened, in which stones are connected to structural honeycomb panels, to glasses, to layered safety glasses and to other non-stony panels, with simultaneous repair of defects being present in stone slabs;

multi-layer composite blocks in which slabs of stone material are joined to slabs of another or many other stone or non-stone materials without interposing between the slabs a separating sheet forming a block which can afterwards be sawed into slabs along a plane which is normal to the slab assembling plane.

Figure 1:
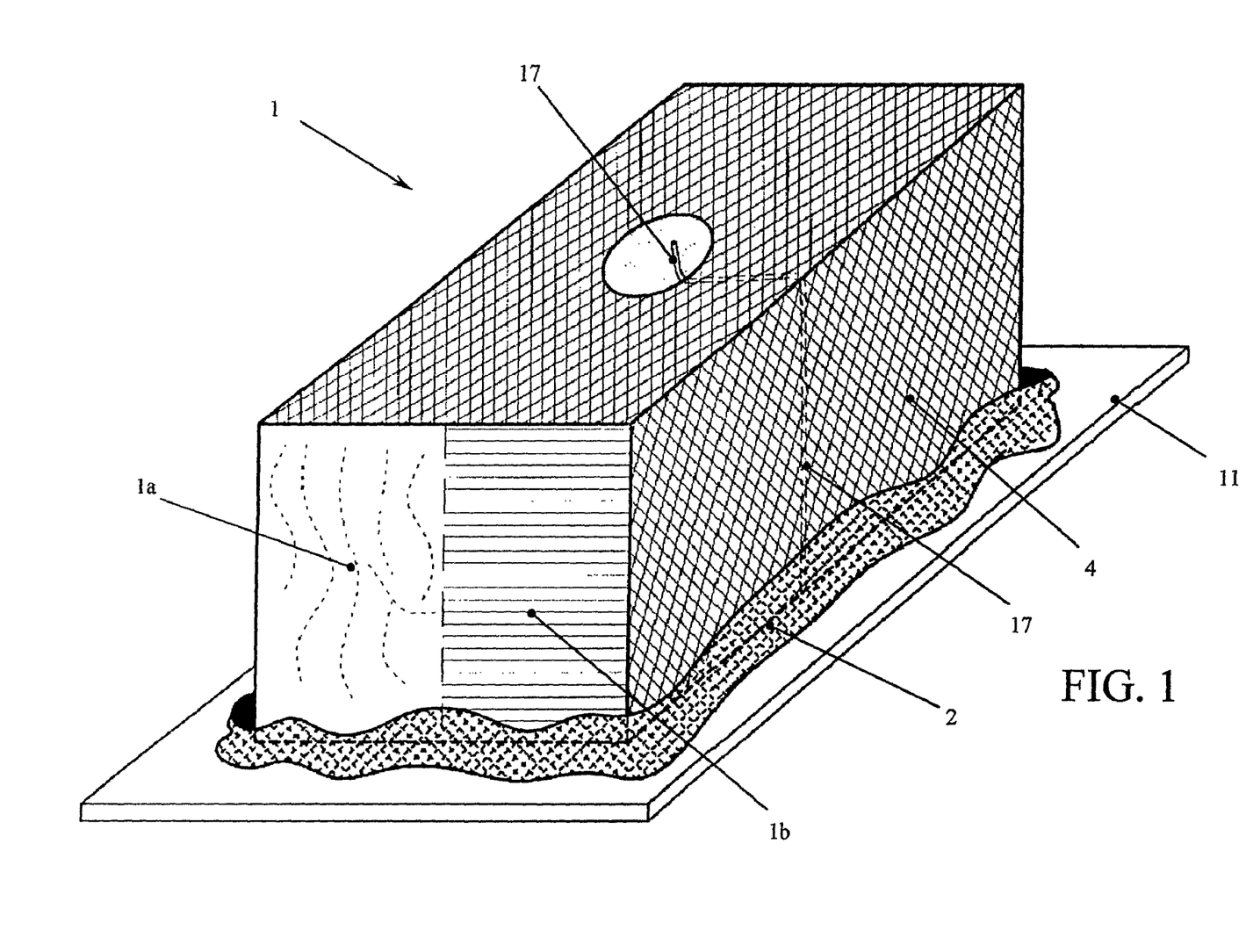
FIG. 1 shows a perspective view of a monolithic block or a block composed of overlapped slabs in a step of the process according to the present invention.
Figures 2A, 2B:
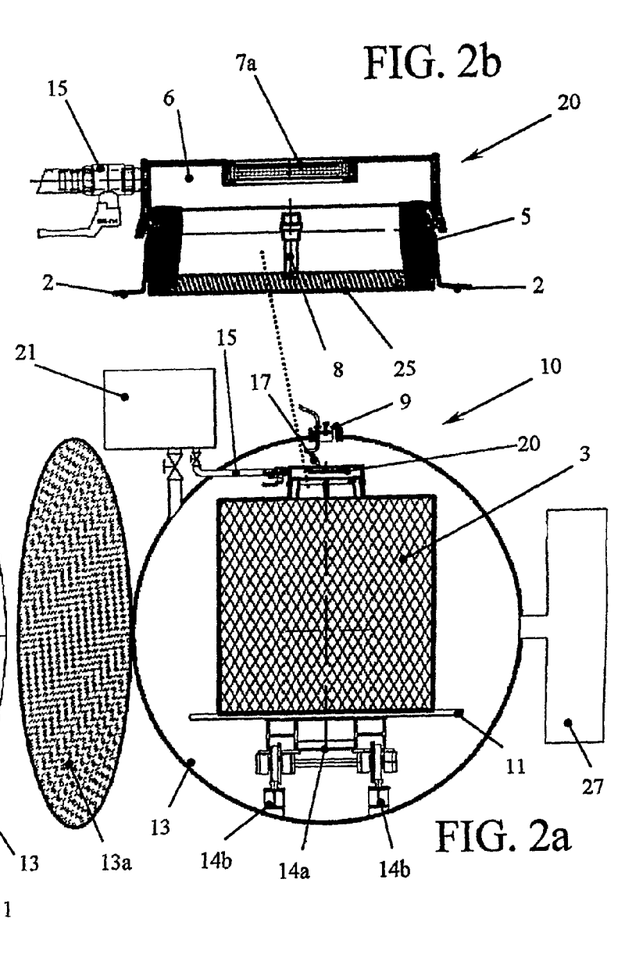
Figure 3A:
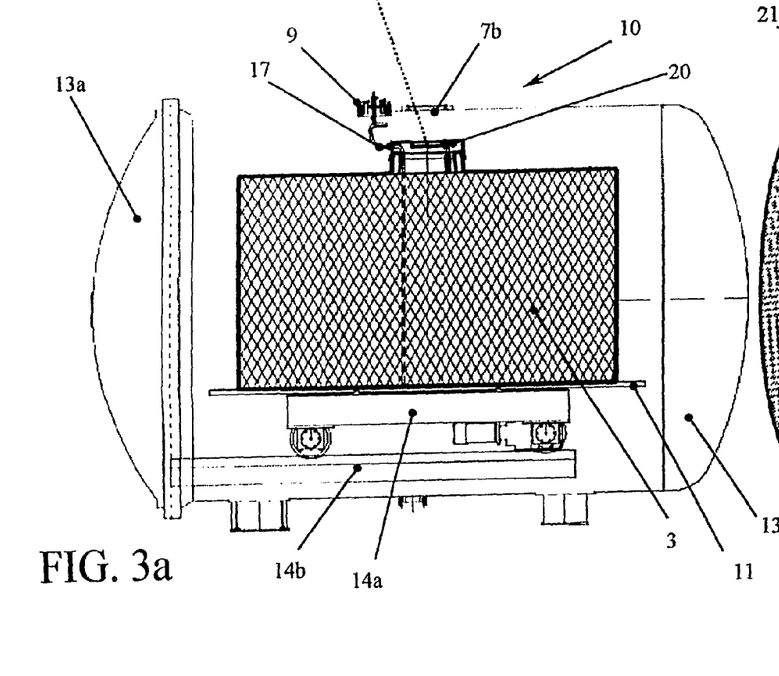
Figure 3B:
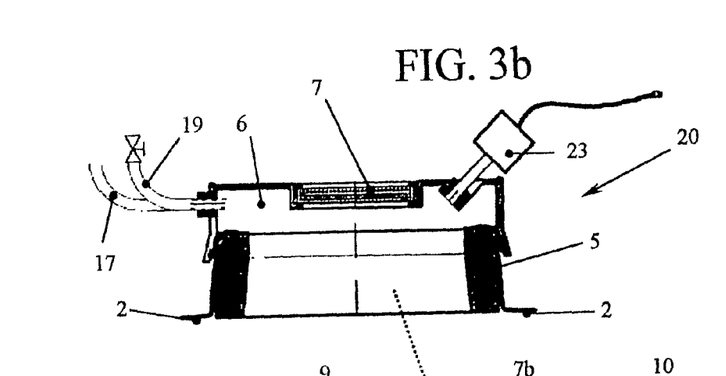
Figure 4:
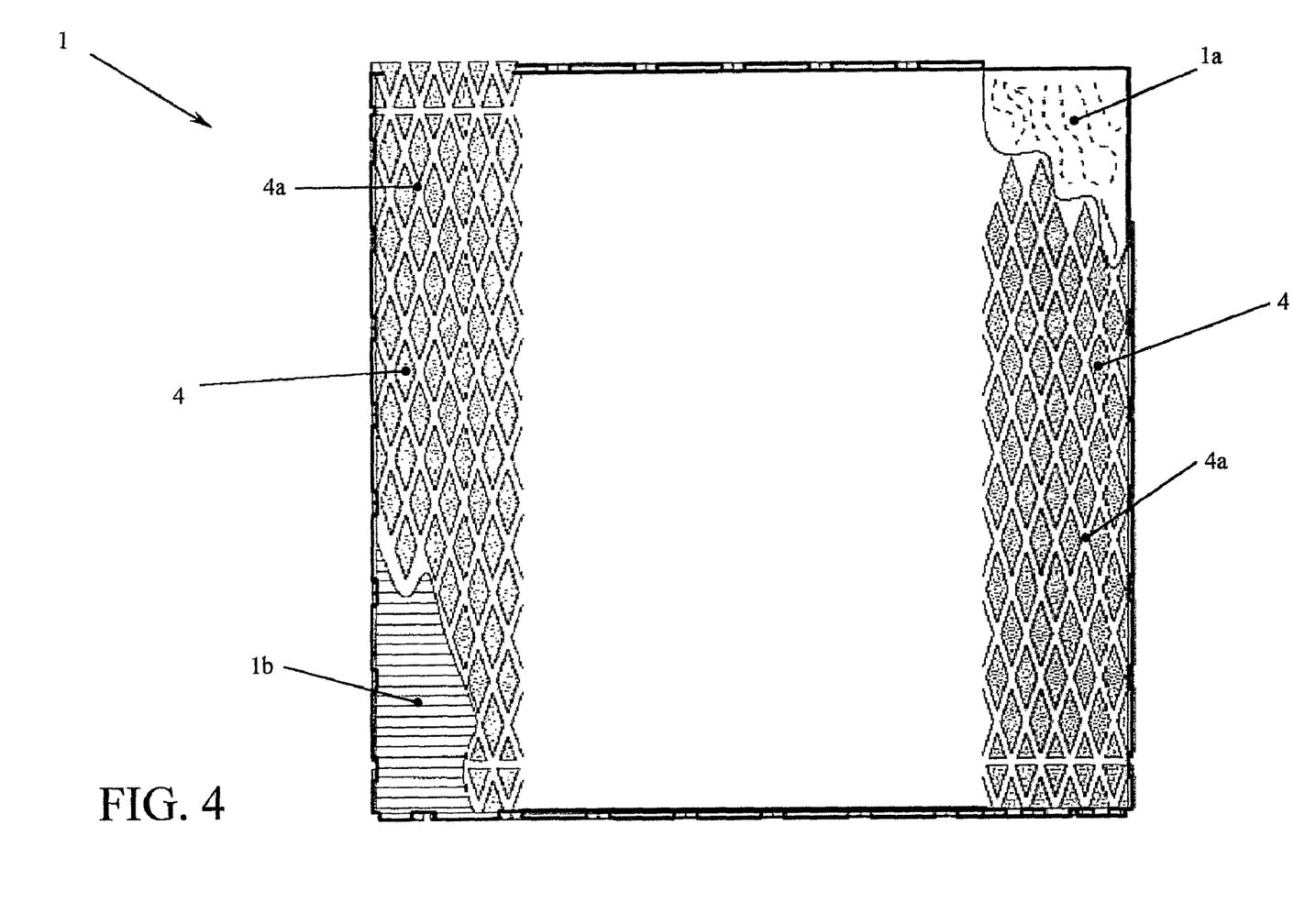
FIG. 4 shows a front view of an element of the system according to the present invention.

With reference to the Figures, it can be noted that the system 10 according to the present invention comprises:

at least one liquid- and gas-tight sheet 2 aimed to form a containing housing 3 of a block 1; preferably the sheet 2 must further be also flexible and deformable;

at least one resin-permeable layer arranged between block 1 and sheet 2 adapted to create a distance between block 1 and sheet 2 and through which the resin can easily flow; such layer can be realised as many overlapped layers made of glass fiber net or other material. Alternatively, such permeable layer can be realised with a resin-permeable channelling sheet 4, like the one shown in FIG. 4, made of non-stick material and equipped with a network 4a of intercommunicating channels on the side to be abutted onto the block 1 and adapted to take the resin with a very small pressure drop in any part of the block 1 on which it is placed; obviously, shape and design of the network 4a can be changed at will, provided that the channels are not able to be squashed and flattened against the block 1 and that the working section of such channels for making resin pass is kept suitable to guarantee a free flow of the resin itself. In addition, the system 10 can comprise one or more layers of glass or reinforcing net (not shown) to be placed between the channelling sheet 4 and the block 1 on the four sides normal to the following and known sawing plane in order to guarantee, to the slabs which will be obtained from the block 1, a perimetral reinforcement frame. Possibly, in case of treatment of a multi-layer block 1 for obtaining a final composite block, it is possible to provide for the use of spacer layers to which resin cannot adhere to be interposed between individual stone layers of the block 1;

at least one closing manifold 20, preferably rested over the block 1 and in communication with the latter one through the resin-permeable layer and/or through a hole obtained in the channelling sheet 4, comprising a central body 5 and a cover 6: the closing manifold 20 is adapted to secure outside it or inside it the sheet 2 edges, to define through part of the internal volume of the central body 5 a resin tank and to realise the liquid- and gas-tight containing housing 3 when inside the containing housing 3 a vacuum is created. In particular, as shown in FIGS. 2b and 3b, the upper edge of the sheet 2 is wrapped outside the central body 5, preferably realised as a pipe with average diameter and a height of a few tens of centimeters, and bent over, after having possibly cut its excess part, towards the interior on the central body 5 thickness in order to place over it the cover 6 which takes care of blocking it and guaranteeing the liquid- and gas-tightness. The central body 5 is preferably obtained from a material on which the used resin is not able to adhere and can be of a slightly tapered shape with its lower diameter which is greater in order to easily free it from the remaining hardened resin remained inside it at the end of the process. The closing manifold 20, composed of the central body 5 and the cover 6, is further equipped with connecting means adapted to connect the containing housing 3 interior with at least one pressure control duct (not shown), at least one duct 15 connected to a first vacuum pump 21 to create a vacuum inside the containing housing 3 and at least one air inserting duct 19 inside the containing housing 3 for breaking vacuum. The closing manifold 20 is further equipped with means for sealingly passing at least one resin supplying duct 17 supplied by resin storing, conditioning and mixing means (not shown). The cover 6 can further be equipped on its upper side with a first visual observatory 7a through which it is possible to visually follow the process inside the closing manifold 20; in addition, it is possible to provide the closing manifold 20 with first lighting means 23 inside it, made for example with optic fibers. Alternatively or in addition to the first visual observatory 7a and the lighting means 23, the closing manifold 20 can be equipped with at least one level sensor 8 of the resin level 25 cooperating with the resin storing, conditioning and mixing means to drive its supply when it falls below a certain safety level inside the closing manifold 20. The level sensors 8 can be two or also three to guarantee an intervention even in case of a faulty sensor. If level sensors 8 are used with automatic resin control and supply, they will be placed at a safety level which is upper by some centimeters than the topmost part of the block 1 so that the resin covers it completely. If one operates manually and at sight, due to the first visual observatory 7a and the lighting means 23, the right resin level 25 will be defined by many thicknesses, for example two centimeters, rested inside the central body 5 and overlapped in such a number that the level 25 of the safety resin can be easily located by one or two thicknesses not covered by the resin;

an autoclave 13, adapted to depressurise and resist to positive pressures, equipped inside it with a supporting platform 11 of the block 1 wrapped by the resin-permeable layer and the sheet 2; such supporting platform 11 can possibly be equipped with a trolley 14a, in this case of a motored type, adapted to slide along tracks 14b to allow an easier transport of the block 1 inside the autoclave 13; with particular reference to FIG. 1, it is possible to note the block 1, monolithic 1a or composed or overlapped slabs 1b, possibly with spacer sheets placed between them, wrapped by the channelling sheet 4 and arranged on the supporting platform 11, at which base the sheet 2 is arranged, which, once placed around the vertical block 1 faces and connected in its upper edge with the closing manifold 20, possibly through the help of elastic gaskets, realises the containing housing 3 insulated from the external environment of the autoclave 13. The autoclave 13 can also be equipped with a second visual observatory 7b, for example placed on the upper vault and centrally, in order to correspond to the first observatory 7a and allow visually following the process inside the closing manifold 20, possibly with the help of lighting provided by second lighting means (not shown), realised for example as at least one external lamp. For connecting the connecting means of the closing manifold 20 with their related ducts, once the platform 11 onto which the block 1 is rested, is transferred inside the autoclave 13, the autoclave 13 can be equipped with at least one mobile service flange 9 or directly through sealing openings (not shown) obtained in the autoclave 13 body. With particular reference to FIG. 2a, the block 1 is shown with a front view placed inside the autoclave 13, shown with one of its doors 13a open, and with the resin supplying duct 17 passing through the mobile service flange 9 and through the sealingly passing means of the closing manifold 20 and inserted inside the containing housing 3 preferably down to the block 1 base, and the duct 15 connected to the first vacuum pump 21 through a sealed opening obtained in the autoclave 13 body. FIG. 3a instead shows a side view of the autoclave 13 in FIG. 2a with the door 13a closed.

The present invention further refers to a process for treating and consolidating natural stone blocks and slabs with hardenable resins, preferably realised through a system 10 as described previously. In particular, the process according to the present invention allows, by forcedly inserting hardenable resins inside the structural defects of a block 1 by using vacuum and positive pressures, both to consolidate quarry blocks in which internal fractures communicate with one of the six faces of the block itself, and to repair fractures, fissures and structural discontinuities which can be found in slabs juxtaposed to form a composite multi-layer block, with interspaces between them extended along both interfaces and equivalent to extended fractures of a quarry block, possibly by interposing, between individual layers, spacer sheets to which the resin cannot adhere, and the further chance of connecting such natural stone slabs to reinforcing sheets and nets or to plane slabs of another natural stone or other materials, even composite ones, or also to mutually cooperate and mutually insulate them, thereby composing a multi-layer monolithic block, which can be afterwards divided into slabs on the normal plane to the slabs previously used to compose it. Moreover, the process according to the present invention allows producing lightened composite materials composed of slabs with thin material and reinforcing nets or other stone materials or other supporting materials including structural panels, mutually joining them without interposing spacer sheets in a block to be sawed normally to the assembling plane of the slabs of stone materials of the same type or of different types as an ornament.

In particular, the process according to the present invention comprises the steps of:

a) heating the block 1 up to a pre-heating temperature to have a thermal mass available which allows perfectly drying the block 1 when it is under vacuum in the autoclave 13, thereby avoiding to form ice in fractures in which water is present: in particular, the block 1 can be heated till it reaches a pre-heating temperature inside it equal to about 15-20° C. In case of treating a multi-layer block 1, it can be provided that the slabs composing the block 1 are heated before assembling them in the block at an upper pre-heating temperature, preferably at 50-60° C., so that the temperature which is lost when assembling the block is of the same order of magnitude inside the block upon its impregnation. Such heating can be obtained with any known means and adapted for this function, for example with a long stay in a hot air oven which circulates around the block for a monolithic block, or in a tunnel oven for slabs. Heating can be electric, with natural gas or GPL burners or other;

b) placing on the supporting platform 11 the liquid- and gas-tight sheet 2 aimed to form the containing housing 3;

c) placing the block 1 on the sheet 2, possibly by interposing a resin-permeable spacer layer whose sizes are equal to the block 1 base or the measures of the multi-layer block 1 slab; in case of multi-layer block 1, rest the first slab on the sheet 2 or the spacer layer proceeding to assembling the block 1, possibly alternating stone slabs to other materials and/or spacer sheets according to the product that has to be obtained;

d) arranging the resin-permeable layer around the four vertical faces of the block 1 and above the block 1;

e) placing along a face of the block 1 the resin supplying duct 17, with its outlet preferably placed next to the block 1 base;

f) lifting the liquid- and gas-tight sheet 2 around the vertical faces of the block 1 and wrap its upper edge onto the closing manifold 20 to realise the containing housing 3: in particular wrap the upper edge of the sheet 2 outside the central body 5, aimed to operate as resin tank and bend it back inwards, after having possibly cut its excess part, on the central body thickness and place the cover 6 on it. Such cover 6 will then be pressed against the central body 5 edge when vacuum will be created in the containing housing 3, pressing in this way the pleated end of the upper edge of the sheet 2 inserted in the closing manifold 20 and afterwards insulating the contents of the containing housing 3 from the autoclave 13 environment;

g) taking the supporting platform 11, on which the block 1 is rested, inside the autoclave 13 and connecting outside the autoclave 13 the various ducts which go out of the closing manifold 20 through the mobile service flange 9 or the sealed openings obtained in the autoclave 13 body;

h) passing the resin supplying duct 17 through the sealingly passing means of the closing manifold 20 and connecting it to the resin storing, conditioning and mixing means;

i) creating vacuum in the containing housing 3, through the first vacuum pump 21 and the duct 15, with the liquid- and gas-tight sheet 2 which is squashed against the block 1. In this step the door of the autoclave 13 can be kept open allowing to check the progressive suction of the containing housing 3, if the block 1 has a regular shape and without particular irregularities which could damage the liquid- and gas-tight sheet 2 pushed against the block. Alternatively, vacuum can be created also in the autoclave 13, checking the pressure differential at reduced values with a gentler progression of the containing housing 3 suction on the block 1; when creating vacuum inside the containing housing 3, the reduced vapour tension generated by the pressure which progressively decreases allows the complete material drying. For such purposes, upon reaching vacuum, wait for the necessary time for a complete exhausting of water being present in the block. With dry block, the vacuum level must tend to zero, but entry of resin inside the housing which contains the block 1 can be correctly performed at residual pressure values on the order of 10/15 millibars;

j) after having reached the desired pressure inside the containing housing 3, injecting resin at fluid state coming from the resin storing, conditioning and mixing means inside the containing housing 3 by means of the resin supplying duct 17. It can be provided that the resin can be suitably coloured to make block 1 repairs compatible with the colour of the treated material;

k) when resin inserted into the block, for this helped by the absence of air, has freely filled all hollow spaces and has projected in the central body 5 reaching the safety level established by the level sensor 8 position or the coverage of thicknesses determined previously, breaking vacuum inside the containing housing 3 and starting the impregnation of block 1 inserting air in the closing manifold 20 through the air inserting duct 19 above the resin level 25, air exerting its thrust by forcedly injecting resin in all structural discontinuities and open injection channels of the block 1 below, while resin is supplied every time it drops below the established level;

l) checking the pressure differential, signalled by known pressure control instruments in the autoclave 13 and in the housing 3 through the pressure control duct, and adjusting through manually controlled valves or valves actuated by suitable known automatic control means that the pressure is kept lower inside the containing housing 3 with respect to the internal autoclave 13 environment, independently from the fact that its door 13*a* is open or closed, by at least 100 millibars over the hydrostatic pressure exerted by resin injected and defined by the block 1 height and the resin level in the central body 5; such pressure differential must be kept for the whole process length;

m) for these purposes, when the vacuum breakage has made the housing interior reach a pressure value which is still compatible with containing the thrust exerted by the hydrostatic pressure of the inserted resin, it is necessary to close the door of the autoclave 13, if previously left open, and pressurise it by means of at least one air compressor 27 to keep the pressure differential between inside and outside the housing 3. If the process starts with an already closed autoclave 13, pressures are adjusted in the containing housing 3 and in the autoclave 13 in order to keep the differential sufficient to contain the hydrostatic thrust, with the internal pressure to the containing housing 3 always lower than the external pressure;

n) completing the vacuum breakage in the housing till an atmospheric value with the differential kept by an overpressure in autoclave produced by the compressor 27;

o) going on increasing the pressure in the containing housing 3 and in the autoclave 13 up to the maximum pressure which can be safely reached and which can be equal to 6 bars or more, always checking and keeping inside the containing housing 3 a pressure lower than the autoclave 13 to increase the resin thrust and to also insert it in less relevant fractures and structural discontinuities;

p) after having reached a maximum pressure level and having left it operate with a maximum thrust on the resin level 25 to complete the impregnation, progressively and in parallel decreasing the pressure in the autoclave 13 and in the housing 3 till the housing 3 interior is taken back to atmospheric pressure, keeping the pressure differential till resin hardens or at least till it externally gelifies in order to prevent the resin from leaking;

q) disconnecting the various ducts;

r) extracting the block 1 from the autoclave 13. The resin hardening can be completed outside the autoclave, in order to then proceed to free the contents from the process housing; in order to more quickly free the autoclave 13 for treating a following block, it can be alternatively provided to insert hot air in the autoclave 13 to accelerate resin solidification at least at its gelling level; the preferred solution for quickly freeing the autoclave is anyway creating again vacuum in the containing housing 3 after having exhausted the pressure by keeping the differential, to then take back at atmospheric pressure the autoclave 13, open the autoclave door and connect the housing 3 to a second independent vacuum pump (not shown) and make the block 1 go out from the autoclave 13 by keeping such second pump active till the resin hardens. Hardening can be accelerated by inserting the block in a circulating air oven;

s) upon having completed the resin hardening, free the block 1 from the sheet 2 and the resin-permeable layer which wrap it, as well as from any other support structure used during the process. The monolithic block 1 is ready to be sawed without problems into even thin slabs. For the multi-layer block 1, the perimeter frame made of hardened resin which connects the slabs must be removed, to separate them afterwards from the block with the help of a plate with suction cups to then proceed with their surface finishing.

With respect to the prior art, the system 10 and the process according to the present invention have the following innovative characteristics:

the resin tank defined by the internal volume of the central body 5 is placed above the block 1 closing the liquid- and gas-tight sheet 2 which wholly wraps the block 1 itself; through such tank, it is possible to always keep the resin level 25 higher than the upper, more projecting part of the upper face of the block 1 so that the resin completely wraps it. Therefore, it is not any more necessary that resin completely wraps the block 1. Therefore, it is not any more necessary to level the upper face and abundantly pour resin above the block 1 to avoid that an uncovered fracture projecting from the block 1 absorbs air when breaking vacuum or under overpressure, making thereby impregnation fail. When the block 1 has not a face which is plane enough to rest the closing manifold 20 thereover, or there is a block 1 projection upwards which exceeds the capability of the manifold 20 to compensate it by rising the resin safety level 25, it can be provided to use at least one bearing spacer (not shown) of the closing manifold 20 adapted to form on the upper block 1 face a bearing plane of the manifold 20 so that it is placed at the most convenient level; merely as an example, the bearing spacer can be made of gypsum or concrete or roamed polyurethane;

the containing housing 3 which contains the block 1 and the autoclave 13 defines two different and separate environments which can be communicated to keep in every process step a pressure in the housing 3 which is lower than the autoclave 13 pressure in order to counteract the hydrostatic pressure of resins inserted in the housing 3 and press the impermeable sheet 2 against the block 1 in every point including the upper block face, removing the prior art containing structures, while resin consumption is reduced to the essential.

Moreover, the above described process according to the present invention is simple and quick and can be repeated many times during working hours. Components and expendable materials are economic. The process is safe for operators and environment and does not produce dangerous wastes. Liquid resins are transported by means of pumps from tanks to thermal conditioning and mixing means in a closed loop till inside the housing containing the block, without gases dispersed in the environment. Operators who use the system 10 and implement the process according to the present invention are never in physical contact with resins. The present invention therefore describes a universal and unique treating system and process which allow repairing all block structure defects communicating with the outside and to core healing the slabs, giving access to a valid production process for producing composite materials in which stone is made integral with other materials.

The invention claimed is:

1. A system for treating and consolidating with hardenable resins monolithic or multi-layer stone blocks, the blocks comprising a plurality of stone layers, the system comprising:

a) one or more than one liquid-tight and gas-tight sheet forming a containing housing of a block, wherein the containing housing comprises an interior;

b) one or more than one resin-permeable layer arranged between the block and the sheet creating a space between the block and the sheet, wherein hardenable resin can flow through the layer;

c) one or more than one closing manifold comprising a central body and a cover, wherein the closing manifold further comprising connecting means connecting the interior of the containing housing with one or more than one pressure control duct, wherein one or more than one of the pressure control ducts is connected to a first vacuum pump, wherein the one or more than one closing manifold further comprises one or more than one air inserting duct inside the containing housing and sealingly passing means of one or more than one resin supplying duct supplied with resin by a resin storing, conditioning and mixing means; and d) an autoclave comprising one or more than one supporting platform of the block wrapped in the resin-permeable layer and in the sheet; and wherein the containing housing which contains the block and the autoclave defines two different and separate environments which communicate with each other to keep a pressure in the containing housing lower than a pressure in the autoclave for counteracting a hydrostatic pressure of the resin inserted in the containing housing and pressing the sheet against the block.

2. The system of claim 1, wherein the sheet is flexible and deformable.

3. The system of claim 1, wherein the resin-permeable layer comprises a plurality of overlapped layers of glass fiber net.

4. The system of claim 1, wherein the resin-permeable layer comprises a channeling sheet permeable to the resin comprising non-stick material, and further comprising a network of intercommunicating channels on a side to be rested onto the block.

5. The system of claim 4, wherein the system further comprises one or more than one layer of glass or reinforcing net between the channeling sheet and the block forming a perimeter reinforcement frame.

6. The system of claim 1, wherein the system further comprises a plurality of spacer layers to which the resin cannot adhere interposed between two or more than two stone layers of the multi-layer block.

7. The system of claim 1, wherein the sheet comprises upper edges, and wherein the closing manifold is secured inside the upper edges of the sheet defined through part of an internal volume of the central body of a tank for the resin and creating the liquid-tight and gas-tight containing housing.

8. The system of claim 7, wherein the upper edge of the sheet is wrapped outside the central body and bent back inwards on a thickness of the central body for placing the cover thereover.

9. The system of claim 1, wherein the central body comprises a material onto which the resin cannot adhere.

10. The system of claim 1, wherein the central body comprises a tapered shape.

11. The system of claim 1, wherein the cover comprises an upper side, and further comprises a first visual observatory on the upper side of the cover.

12. The system of claim 1, wherein the closing manifold comprises a first lighting means for lighting the interior of the containing housing.

13. The system of claim 12, wherein the lighting means comprises optic fibers.

14. The system of claim 1, wherein the closing manifold further comprises one or more than one level sensor for sensing a level of the resin, wherein the one or more than one level sensor cooperates with the resin storing, conditioning and mixing means.

15. The system of claim 1, wherein the closing manifold further comprises a plurality of overlapped thicknesses for checking the level of the resin.

16. The system of claim 1, wherein the autoclave further comprises tracks inside the autoclave, and wherein the supporting platform comprises a trolley sliding along tracks.

17. The system of claim 16, wherein the trolley comprises a motor.

18. The system of claim 1, wherein the autoclave further comprises a second visual observatory corresponding to the first visual observatory.

19. The system of claim 1, wherein the autoclave further comprises one or more than one mobile service flange connecting the pressure control ducts.

20. The system of claim 1, wherein the autoclave further comprises openings for passing the pressure control ducts, the openings with the pressure control ducts being sealed.

21. The system of claim 1, wherein the central body comprises an internal volume, and wherein the internal volume defines a tank for the resin placed above the block closing the sheet which completely wraps the block.

22. The system of claim 21, wherein the resin, through the tank, has a higher level than, and completely surrounds an upper, more projecting part of an upper face of the block.

23. A process for treating and consolidating natural stone blocks and slabs with hardenable resins, the process comprising the steps of:
a) providing the system of claim 1;
b) heating the monolithic block or the stone slabs to a pre-heating temperature;
c) placing on the supporting platform the liquid-tight and gas-tight sheet on which the layer of material permeable to the resin is to be placed;
d) placing the block or assembling the stone slabs which compose the block onto the sheet;
e) arranging the resin-permeable layer around four vertical faces of the block and above the block;
f) placing the resin supplying duct along one face of the block;
g) lifting the liquid-tight and gas-tight sheet around the vertical faces of the block and wrapping the upper edge onto the closing manifold to make the containing housing;
h) placing the supporting platform inside the autoclave and connecting the ducts through the mobile service flange or the sealed openings;
i) passing the resin supplying duct through the sealingly passing means of the closing manifold and connecting the duct to the resin storing, conditioning and mixing means;
j) creating a vacuum in the containing housing through the first vacuum pump and the duct;
k) injecting the resin in a fluid state coming from the resin storing, conditioning and mixing means inside the containing housing through the resin supplying duct;
l) breaking the vacuum inside the containing housing and starting an impregnation of the block by inserting air in the closing manifold through the air inserting duct above the level of the resin;
m) checking a pressure differential in the autoclave and in the containing housing through the pressure control duct, and operating by means of manually controlled valves or valves actuated by automatic control means for keeping a pressure inside the containing housing lower than a pressure inside the autoclave;
n) pressurizing the autoclave through at least one air compressor;
o) creating an overpressure in the autoclave;
p) increasing a pressure in the containing housing and in the autoclave keeping the pressure inside the containing housing lower than the pressure inside the autoclave;
q) after having reached a maximum pressure level and having left the pressure to operate with a maximum thrust onto the resin level to complete the impregnation, progressively and in parallel decreasing the pressure in the autoclave and in the containing housing by taking back the containing housing to atmospheric pressure and keeping the pressure differential until the resin hardens or until the resin becomes a gel;

r) disconnecting the ducts;

s) extracting the block from the autoclave; and t) freeing the block from the sheet and the resin-permeable layer.

24. The process according to claim 23, wherein the pre-heating temperature is about 15-20° C. inside the monolithic block.

25. The process according to claim 23, wherein the pre-heating temperature is about 50-60° C. in the slabs before assembling them to form a multiple-layer block.

26. The process according to claim 23, wherein the pressure differential is equal to or greater than 100 millibars in addition to a hydrostatic pressure exerted by the injected resin.

27. The process according to claim 23, further comprising during or after the step q), the step of inserting such hot air in the autoclave as to accelerate a solidification of the resin.

28. The process according to claim 23, further comprising, after the step q), a step of creating vacuum in the containing housing, and then connecting the containing housing to a second independent vacuum pump and extracting the block from the autoclave while keeping the second vacuum pump active until the resin hardens.

29. A system for treating and consolidating with hardenable resins monolithic or multi-layer stone blocks, the blocks comprising a plurality of stone layers, the system comprising:

a) one or more than one liquid-tight and gas-tight sheet forming a containing housing of a block, wherein the containing housing comprises an interior;

b) one or more than one resin-permeable layer arranged between the block and the sheet creating a space between the block and the sheet, wherein hardenable resin can flow through the layer;

c) one or more than one closing manifold comprising a central body and a cover, wherein the closing manifold further comprises connecting means connecting the interior of the containing housing with one or more than one pressure control duct, wherein one or more than one of the pressure control ducts is connected to a first vacuum pump, wherein the one or more than one closing manifold further comprises one or more than one air inserting duct inside the containing housing and sealingly passing means of one or more than one resin supplying duct supplied with resin by a resin storing, conditioning and mixing means; and d) an autoclave comprising one or more than one supporting platform of the block wrapped in the resin-permeable layer and in the sheet;

wherein the sheet comprises upper edges, and wherein the closing manifold is secured inside the upper edges of the sheet defined through part of an internal volume of the central body of a tank for the resin and creating the liquid-tight and gas-tight containing housing; and wherein the upper edge of the sheet is wrapped outside the central body and bent back inwards on a thickness of the central body for placing the cover thereover.

30. The system of claim 29, wherein the sheet is flexible and deformable.

31. The system of claim 29, wherein the resin-permeable layer comprises a plurality of overlapped layers of glass fiber net.

32. The system of claim 29, wherein the resin-permeable layer comprises a channeling sheet permeable to the resin comprising non-stick material, and further comprising a network of intercommunicating channels on a side to be rested onto the block.

33. The system of claim 32, wherein the system further comprises one or more than one layer of glass or reinforcing net between the channeling sheet and the block forming a perimeter reinforcement frame.

34. The system of claim 29, wherein the system further comprises a plurality of spacer layers to which the resin cannot adhere interposed between two or more than two stone layers of the multi-layer block.

35. The system of claim 29, wherein the central body comprises a material onto which the resin cannot adhere.

36. The system of claim 29, wherein the central body comprises a tapered shape.

37. The system of claim 29, wherein the cover comprises an upper side, and further comprises a first visual observatory on the upper side of the cover.

38. The system of claim 29, wherein the closing manifold comprises a first lighting means for lighting the interior of the containing housing.

39. The system of claim 38, wherein the lighting means comprises optic fibers.

40. The system of claim 29, wherein the closing manifold further comprises one or more than one level sensor for sensing a level of the resin, wherein the one or more than one level sensor cooperates with the resin storing, conditioning and mixing means.

41. The system of claim 29, wherein the closing manifold further comprises a plurality of overlapped thicknesses for checking the level of the resin.

42. The system of claim 29, wherein the autoclave further comprises tracks inside the autoclave, and wherein the supporting platform comprises a trolley sliding along tracks.

43. The system of claim 42, wherein the trolley comprises a motor.

44. The system of claim 29, wherein the autoclave further comprises a second visual observatory corresponding to the first visual observatory.

45. The system of claim 29, wherein the autoclave further comprises one or more than one mobile service flange connecting the pressure control ducts.

46. The system of claim 29, wherein the autoclave further comprises openings for passing the pressure control ducts, the openings with the pressure control ducts being sealed.

47. The system of claim 29, wherein the central body comprises an internal volume, and wherein the internal volume defines a tank for the resin placed above the block closing the sheet which completely wraps the block.

48. The system of claim 47, wherein the resin, through the tank, has a higher level than, and completely surrounds an upper, more projecting part of an upper face of the block.

49. A process for treating and consolidating natural stone blocks and slabs with hardenable resins, the process comprising the steps of:

a) providing the system of claim 29;

b) heating the monolithic block or the stone slabs to a pre-heating temperature;

c) placing on the supporting platform the liquid-tight and gas-tight sheet on which the layer of material permeable to the resin is to be placed;

d) placing the block or assembling the stone slabs which compose the block onto the sheet;

e) arranging the resin-permeable layer around four vertical faces of the block and above the block;

f) placing the resin supplying duct along one face of the block;

g) lifting the liquid-tight and gas-tight sheet around the vertical faces of the block and wrapping the upper edge onto the closing manifold to make the containing housing;
h) placing the supporting platform inside the autoclave and connecting the ducts through the mobile service flange or the sealed openings;
i) passing the resin supplying duct through the sealingly passing means of the closing manifold and connecting the duct to the resin storing, conditioning and mixing means;
j) creating a vacuum in the containing housing through the first vacuum pump and the duct;
k) injecting the resin in a fluid state coming from the resin storing, conditioning and mixing means inside the containing housing through the resin supplying duct;
l) breaking the vacuum inside the containing housing and starting an impregnation of the block by inserting air in the closing manifold through the air inserting duct above the level of the resin;
m) checking a pressure differential in the autoclave and in the containing housing through the pressure control duct, and operating by means of manually controlled valves or valves actuated by automatic control means for keeping a pressure inside the containing housing lower than a pressure inside the autoclave;
n) pressurizing the autoclave through at least one air compressor;
o) creating an overpressure in the autoclave;
p) increasing a pressure in the containing housing and in the autoclave keeping the pressure inside the containing housing lower than the pressure inside the autoclave;
q) after having reached a maximum pressure level and having left the pressure to operate with a maximum thrust onto the resin level to complete the impregnation, progressively and in parallel decreasing the pressure in the autoclave and in the containing housing by taking back the containing housing to atmospheric pressure and keeping the pressure differential until the resin hardens or until the resin becomes a gel;
r) disconnecting the ducts;
s) extracting the block from the autoclave; and
t) freeing the block from the sheet and the resin-permeable layer.

50. The process according to claim 49, wherein the preheating temperature is about 15-20° C. inside the monolithic block.

51. The process according to claim 49, wherein the preheating temperature is about 50-60° C. in the slabs before assembling them to form a multiple-layer block.

52. The process according to claim 49, wherein the pressure differential is equal to or greater than 100 millibars in addition to a hydrostatic pressure exerted by the injected resin.

53. The process according to claim 49, further comprising during or after the step q), the step of inserting such hot air in the autoclave as to accelerate a solidification of the resin.

54. The process according to claim 49, further comprising, after the step q), a step of creating vacuum in the containing housing, and then connecting the containing housing to a second independent vacuum pump and extracting the block from the autoclave while keeping the second vacuum pump active until the resin hardens.

* * * * *